United States Patent Office 3,591,599
Patented July 6, 1971

3,591,599
ISOINDOLO[1,2-b]BENZOTHIAZOL-11 (4bH) ONE 5-OXIDES
Hans Hoehn, Regensburg, and Ernst Schulze, Burgweinting, Germany, assignors to E. R. Squibb & Sons, Inc., New York, N.Y.
No Drawing. Filed Dec. 31, 1969, Ser. No. 889,683
Int. Cl. C07d 99/06
U.S. Cl. 260—304     9 Claims

ABSTRACT OF THE DISCLOSURE

New isoindolo[1,2-b]benzothiazol-11(4bH)one 5-oxides which are anti-inflammatory and analgesic agents have the formula

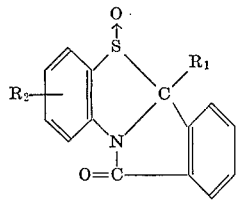

BRIEF SUMMARY OF THE INVENTION

This invention relates to a new isoinodolo[1,2-b]benzothiazol-11(4bH)one 5-oxide and its derivatives. The new compounds have the structural Formula I (I)

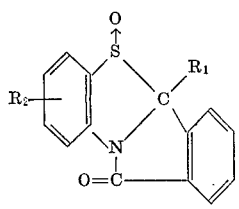

In Formula I, $R_1$ represents hydrogen, which is preferred, lower alkyl or phenyl-lower alkyl and $R_2$ represents hydrogen, lower alkoxy or trihalomethyl, especialy trifluoromethyl.

The lower alkyl groups include straight and branched chain groups such as methyl, ethyl, propyl, isopropyl, butyl, isobutyl and the like, preferably methyl, ethyl, propyl or butyl. The phenyl-lower alkyl groups include the same radicals. Benzyl is preferred. The lower alkoxy groups include, for example, methoxy, ethoxy, propoxy and the like. All four halogens are within the scope of the invention but chlorine and bromine, especially the first, are preferred.

DETAILED DESCRIPTION

Products of Formula I, wherein $R_1$ and $R_2$ have the meanings defined above are produced from isoindolo[1,2-b]benzothiazol-11-(4bH)ones of Formula II:

(II)

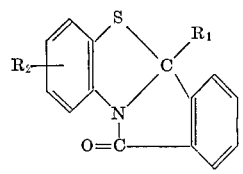

e.g. by treatment of the latter with an oxidizing agent such as sodium- or potassium meta periodate at a temperature range of 15–50° C.

The intermediates of Formula II are produced by the reaction of o-aminothiophenol of Formula III with an o-acylbenzoic acid derivative of Formula IV:

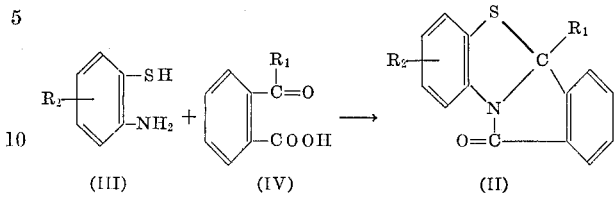

(III)     (IV)     (II)

This may be effected by heating the reagents with or without a solvent at a temperature of 130–150° C. for several hours. The solvents in question may be xylol and halogenated benzenes as well as mixtures of solvents, which are suitable to form binary or tertiary systems with water.

The new compounds of this invention have anti-inflammatory properties and are useful as anti-inflammatory agents, for example, to reduce local inflammatory conditions such as those of an edematous nature or resulting from proliferation of connective tissue in various animals such as rats, dogs, and the like, when given orally in dosages of about 5 to 50 mg./kg. per day, preferably 5 to 25 mg./kg. per day, in single or 2 to 4 divided doses, as shown by the carageenan edema assay in rats. The compound may be utilized in compositions such as tablets, capsules, solutions or suspensions containing up to about 300 mg. of a compound of Formula I made up in conventional manner with a physiologically acceptable vehicle or carrier for oral administration to animals as indicated above. Additionally, at the same dosage levels given above, they show analgesic activity and immunosuppressive effects.

The following examples illustrate the invention. All temperatures are shown on the centigrade scale.

EXAMPLE 1

4b-ethylisoindolo[1,2-b]benzothiazol-11(4bH)-one 5-oxide 2.67 g. of 4b-ethylisoinodol[1,2-b]benzothiazol-11-one are dissolved in 100 ml. of methanol. By stirring and cooling with tap water, a solution of 2.55 g. of sodium metaperiodate in 20 ml. water is dropped in. The reaction temperature is maintained in the range of 15–20°. The reaction mixture is stirred for 5 hours at room temperature and then is allowed to stand overnight. The precipitate is filtered under suction and separated from sodium iodate by washing with water. The residue represents 0.25 g. of 4b-ethylisoindolo[1,2-b]benzothiazol-11 - one 5 - oxide M.P. 136–137° C.

The methanol solution is concentrated under vacuum to a volume of 10–20 ml. at a bath temperature of approximately 30°. The thus obtained crystalline product is filtered under suction, washed with water and methanol, and then dried in the air, giving 2.35 g. of 4b-ethylisoindolo [1,2-b]benzothiazol-11-one 5-oxide, M.P. 133–135°. The total yield amounts 2.6 g.=92% of theory. Recrystallization with methanol provides a compound with the M.P. of 137° C.

EXAMPLE 2

4b-methylisoindolo[1,2-b]benzothiazol-11(4bH)-one 5-oxide

By substituting an equivalent amount of 4b-methylisoindolo[1,2-b]-benzothiazol-11(4bH)-one for the 4b-ethylisoindolo[1,2-b]benzothiazol - 11(4bH) - one in the procedure of Example 1, 4b-methylisoindolo[1,2-b]benzothiazol-11(4bH)-one 5-oxide, M.P. 127–128° is obtained. Recrystallization with methanol provides a compound with the M.P. of 132–133°.

EXAMPLE 3

4b-propylisoindolo[1,2-b]benzothiazol-11(4bH)-one 5-oxide

To 2.81 g. 4b-propylisoindolo[1,2-b]benzothiazol-11-(4bH)-one in 100 ml. of methanol, heated to 50° is added dropwise and with stirring a solution of 2.55 g. sodium metaperiodate in 20 ml. of water. The stirring is continued 5 hours at 50°. After the mixture has been left over night, the precipitated sodium iodate is filtered under suction and the solution is concentrated in vacuum as far as possible. The residue is treated with water to remove sodium iodate, is again filtered under suction and dried in the air. 2.8 g. of 4b-propylisoindolo[1,2-b]benzothiazol-11(4bH)-one 5-oxide are obtained (yield 94% of theory). The M.P. of the crude product is at about 135–137°. Recrystallization with methanol provides a product with the M.P. 145–147°.

EXAMPLE 4

4b-butylisoindolo[1,2-b]benzothiazol-11(4bH)-one 5-oxide

By substituting an equivalent amount of 4b-butylisoindolo[1,2-b]benzothiazol-11(4bH)-one for the 4b-propylisoinodolo[1,2-b]benzothiazol-11(4bH)-one in the procedure of Example 3, 4b-butylisoindolo[1,2-b]benzothiazol-11(4bH)-one 5-oxide, M.P. 128–129° is obtained.

EXAMPLE 5

Isoindolo[1,2-b]benzothiazol-11(4bH)-one 5-oxide

By substituting an equivalent amount of isoindolo[1,2-b]benzothiazol-11(4bH)-one for the 4b-propylisoindolo[1,2-b]benzothiazol-11(4bH)-one in the procedure of Example 3, isoindolo[1,2-b]benzothiazol-11(4bH)-one 5-oxide, M.P. 182–183° is obtained.

EXAMPLE 6

4b-methylisoindolo[1,2-b]benzothiazol-11-(4bH)-one 148.3 g. o-acetylbenzoic acid, 124 g. o-aminothiophenol and 800 ml. xylol are heated for 6 hours. The water which forms is continuously separated by a water separator and the xylol is allowed to run back into the flask. Subsequently, the remaining xylol is evaporated off in vacuum and the residue is treated with ethanol. The crystals (yield 79%) which have formed, are filtered off, washed with a small amount of ether and recrystallized from ethanol to give 4b-methylisoindolo[1,2-b]benzothiazol-11(4bH)-one, M.P. 105–106°.

The following additional starting materials are prepared by the foregoing procedure by substituting for the o-acetylbenzoic acid the equivalent amount of o-valerylbenzoic acid, o-butyrylbenzoic acid, o-propionylbenzoic acid, or o-formylbenzoic acid:

4b-butylisoindol[1,2-b]benzothiazol-11(4bH)-one, M.P. 91–93°,
4b-propylisoindolo[1,2-b]benzothiazol-11(4bH)-one, M.P. 108–109°,
4b-ethylisoindolo[1,2-b]benzothiazol-11(4bH)-one, M.P. 101–103°,
isoindolo[1,2-b]benzothiazol-11(4bH)-one, M.P. 176–177°.

In addition, by using in the procedure of Example 1 the following substituted isoindolo[1,2-b]benzothiazole-11(4bH)-ones (obtained by the procedure of the above Example 6, substituting for the o-acetylbenzoic acid and o-aminothiophenol, respectively, the indicated substituted analog of Formula IV or III), the 5-oxides named below are obtained:

4b-benzylisoindolo[1,2-b]benzothiazol-11(4bH)-one, M.P. 123–124°,
8-chloro-4b-methylisoindolo[1,2-b]benzothiazol-11-(4bH)-one, M.P. 176–177°,
8-trifluoro-methyl-4b-methylisoindolo[1,2-b]benzothiazol-11(4bH)-one, M.P. 169–170°,
7-methoxy-4b-methylisoindolo[1,2-b]benzothiazol-11(4bH)-one, M.P. 159–161°,
7-ethoxy-4b-methylisoindolo[1,2-b]benzothiazol-11(4bH)-one, M.P. 106–107°,
8-chlorisoindolo[1,2-b]benzothiazol-11(4bH)-one, M.P. 208–209°,
7-methoxyisoindolo[1,2-b]benzothiazol-11(4bH)-one, M.P. 177–178°, The following oxides are obtained:

4b-benzylisoindolo[1,2-b]benzothiazol-11(4bH) one 5-oxide, M.P. 155–156°,
8-chloro-4b-methylisoindolo[1,2-b]benzothiazol-11-(4bH)-one 5-oxide, M.P. 226–229°,
8-trifluormethyl-4b-methylisoindolo[1,2-b]benzothiazol-11(4bH)-one 5-oxide, M.P. 156–157°,
7-methoxy-4b-methylisoindolo[1,2-b]benzothiazol-11(4bH)-one 5-oxide, M.P. 132–133°,
7-ethoxy-4b-methylisoindolo[1,2-b]benzothiazol-11-(4bH)-one 5-oxide, M.P. 130–131°,
8-chlorisoindolo[1,2-b]benzothiazol-11(4bH)-one 5-oxide, M.P. 205–206°,
7-methoxyisoindolo[1,2-b]benzothiazol-11(4bH)-one 5-oxide, M.P. 179–180°.

What is claimed is:

1. A compound of the formula

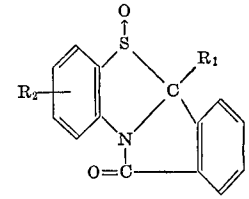

wherein $R_1$ is hydrogen, lower alkyl or phenyl-lower alkyl and $R_2$ is hydrogen, lower alkoxy, halogen or trihalomethyl.

2. A compound as in Claim 1, wherein $R_1$ and $R_2$ each is hydrogen.

3. A compound as in claim 1, wherein $R_1$ is lower alkyl and $R_2$ is hydrogen.

4. A compound as in claim 3, wherein the lower alkyl group is methyl.

5. A compound as in claim 3, wherein the lower alkyl group is ethyl.

6. A compound as in claim 1, wherein $R_1$ is lower alkyl and $R_2$ is halogen.

7. A compound as in claim 6, wherein the lower alkyl group is methyl and the halogen is chloro.

8. A compound as in claim 1, wherein $R_1$ is lower alkyl and $R_2$ is trifluoromethyl.

9. A compound as in claim 8, wherein the lower alkyl group is methyl.

References Cited

UNITED STATES PATENTS 3,329,684   7/1967   Houlihan _____ 260—304

ALEX MAZEL, Primary Examiner

R. J. GALLAGHER, Assistant Examiner

U.S. Cl. X.R.

260—999